Sept. 2, 1958 G. WEISS 2,850,588
DIFFERENTIAL GOVERNOR
Filed April 3, 1956
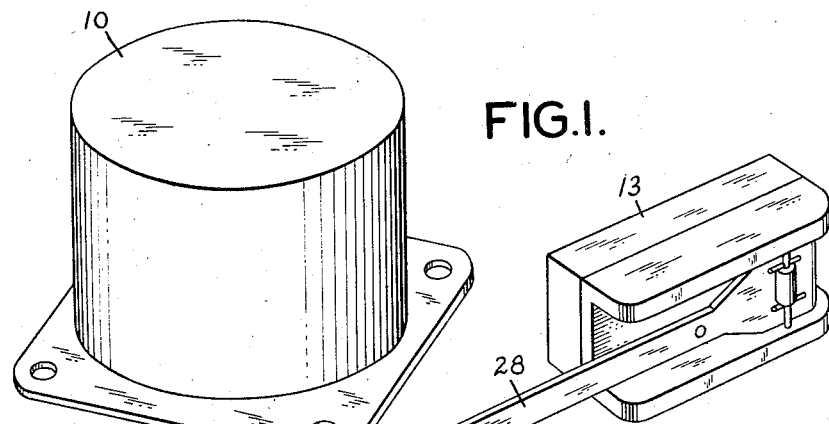
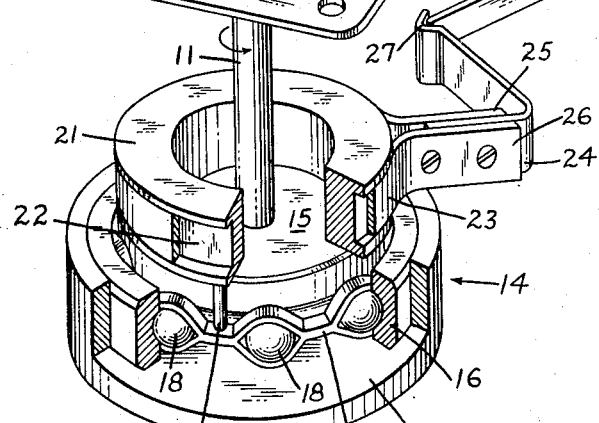
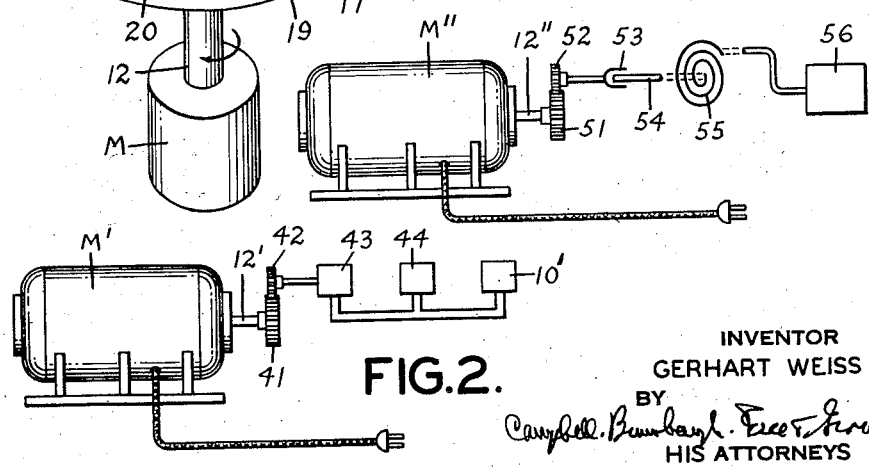
INVENTOR
GERHART WEISS
BY
HIS ATTORNEYS

United States Patent Office 2,850,588
Patented Sept. 2, 1958

2,850,588
DIFFERENTIAL GOVERNOR

Gerhart Weiss, Flushing, N. Y., assignor to Fairchild Engine and Airplane Corporation, Hagerstown, Md., a corporation of Maryland Application April 3, 1956, Serial No. 575,876

6 Claims. (Cl. 200—61.46)

This invention relates to governor controlled devices and systems, and it relates particularly to an improvement in governor-controlled systems by means of which the speed or timing of a power-driven device can be regulated with a high degree of accuracy and under the control of a suitable timing device.

It is quite common to regulate the speed of a power-driven device by means of a centrifugal governor which may be related in its operation to the speed of the driven device or a control mechanism therefor. The characteristics of such centrifugal governors are well known in the art. Thus, it is recognized that a centrifugal governor does not have a high degree of sensitivity and its sensitivity decreases with an increasing speed of rotation of the governor. That is, at higher speeds, a greater increase or decrease in speed is required to cause a response of the governor than is required for an equivalent response at a lower speed. Due to this fact, centrifugal governors are not very satisfactory for the control of devices which require a sensitive control.

The present invention overcomes the deficiencies of a centrifugal governor in a control system by providing a governor which operates on a differential principle whereby an over-all change in the relative motions of the timer and a driven element is exhibited by the motion of another part which, in turn, exercises a control over the operation of the driven device to bring it into synchronism or properly timed relation to the timer. The new governor is extremely sensitive to small changes in the relative speed or differences in the speed of rotation or motion of the timing and driven devices and hence can exert a close control over the operation of the device. Nevertheless, by suitable adjustment, it is possible to drive a constantly driven element in timed relation to a timing device which operates intermittently, such as, for example, an escapement driven timing mechanism. Small intermittent movements can thus be damped out or nullified in the present system thereby making the driven element responsive to the timing element, but non-responsive to the small intermittent movements which may occur with an escapement driven timer.

The device embodying the present invention is simple in structure and is capable of use with devices operating at either low or high speeds and with excellent sensitivity in either range of speeds.

For a better understanding of the present invention reference may be had to the accompanying drawings in which:

Figure 1 is a perspective view of a typical system including a governor and timing mechanism embodying the present invention, the governor being shown partially broken away to disclose details thereof;

Figure 2 is a schematic illustration of a control circuit wherein the power driven element controlled by the governor supplies power for operating the timer; and Figure 3 is a schematic illustration of a modified type of system for supplying power for operating the timer.

The system disclosed for purposes of illustration may be used for controlling guided missiles, machinery that must be operated in timed relation and for other purposes requiring very accurate control of a power driven element. To that end, the device includes an electrically driven timing motor 10 of the escapement controlled type. Such motors are available on the market, one such motor being manufactured by A. W. Hayden Company of Waterbury, Connecticut, and known as the Chronometric Governed Timing Motor. This motor has an escapement control so that the output or drive shaft 11 of the timing motor rotates intermittently.

Other types of timing devices, such as constant velocity synchronous motors, clock spring motors, electronic timers or oscillators may be used with equal facility.

Rotation of the shaft 11 controls the rotation of another coaxial, but relatively rotatable, shaft 12 which is driven in any suitable way by means of a motor M or other power driven device which is to be governed or controlled by the timing motor 10. In the case of an electrically driven motor M for driving the shaft 12 and other related elements, the system includes a microswitch 13 which may be opened and closed to energize and deenergize the motor M. Regulation of the rotation of shaft 12 is controlled by the operation of the switch 13 to maintain it in synchronism or in timed relation to the shaft 11 of the timer 10. The governor 14 for controlling the timing includes a disc-like member 15 fixed to the end of the shaft 11 and forming the inner race of a bearing having an outer race 16 carried by and fixed to a disc 17 which is fixed to the upper end of the shaft 12. The inner race 15 and the outer race 16 are relatively rotatable and turn with their respective shafts 11 and 12. Interposed between and in tight rolling engagement with the races 15 and 16 are a series of rolling elements such as the balls 18. The balls 18 or other elements are mounted for rotation in, and with a minimum of movement circumferentially of, a cage 19 which is provided with a plurality of upwardly extending pins 20 joining it to an annular ring 21 which moves with the cage 19. A peripheral groove 22 is formed in the ring 21 to receive a spring collar 23 in sliding relation thereto to serve as a clutch member connecting the ring 21 to an arm 24 fixed to and between the radially extending ends 25 and 26 and the collar 23, but permitting slippage between the rings 21 and 23, if necessary. The arm 24 is bent laterally and is provided with a groove 27 near its outer end which engages the actuating arm 28 of the microswitch.

When the shafts 11 and 12 are rotated at equal speeds in opposite directions, the balls 18 roll between them and the ball race 19, the ring 21 and the arm 26 are not displaced angularly, and under these conditions, the switch 23 will remain closed. If the motor M tends to cause the shaft 12 to rotate at higher speed than the shaft 11 and the timing device 10, the change in relative movement of the races will cause the ball retainer 19, the ring 21 and the arm 24 to rotate clockwise in a direction to open the microswitch 19, thereby de-energizing the motor M and allowing the speed of the shaft 12 to decrease. When the timing shaft 11 tends to overrun the driven shaft 12, the race 19 will be rotated in the opposite direction thereby moving the arm 24 in a counter-clockwise direction and closing the switch 13 to energize the motor M and increase the speed of the shaft 12.

In this way, the motor will be de-energized and energized, as required, to keep the motor M and the shaft 12 moving in properly timed relation to the rotation of the shaft 11.

If the motor M should fail and the shaft 12 is stopped, the timing device can overrun the shaft 12 without damage to it or the switch 13 because slippage takes place between the ring 23 and the ring 21.

As indicated above, the timing motor 10 drives the shaft intermittently. Accordingly, if the governor were not capable of nullifying the intermittent movements of the shaft 11, the motor driving the shaft 12 would be energized and de-energized at the same rate as the intermittent movements of the shaft 11. The new system overcomes this intermittent action by providing for a slight loss of motion in the connection between the arm 26 and the contacts of the microswitch 14. The amount of lost motion can be adjusted by adjusting the spacing of the contacts and by varying the length of the operating arm 28. In this way, enough lost motion can be introduced between the shaft 11 and the microswitch 13 to nullify the intermittent movement of the shaft 11 while keeping the system sensitive to small relative movements of the shafts 11 and 12. It will be understood, of course, that when continuously driven timing devices are used, lost motion in the system can be substantially eliminated and an even more sensitive control can be obtained thereby.

While the invention has been described with reference to its use in an electrically controlled system, it will be understood that the system can be readily adapted to mechanical or hydraulic controls and to synchronize the movements of hydraulic motors or other types of motors with a timing device, if required.

Electrically driven timing devices of the kind described usually require a source of direct current of relatively low voltage, for example, 4 to 32 volts, as compared with the voltage usually supplied for driving the motor M or other prime mover which moves the shaft 12.

Inasmuch as a separate source of power for the timer 10 is not available at all times, the motor M may be used to supply power for driving the timer. As shown in Figure 2 of the drawing, the motor M' is provided with take-off gearing 41 from the shaft 12' for driving a direct current generator 43. The generator supplies electrical energy to storage batteries or cells 44 which are connected to the timing motor 10' to drive it. In this way, a direct current potential is always available to the timer motor, this potential being independent of the power supplied to the motor M'.

In cases where a chronometer movement operated by means of a spring is used for timing the prime mover, a somewhat different system may be provided, as disclosed in Figure 3. In this system the motor or prime mover M" is connected by gearing 51, 52 to a slip clutch 53 that is connected to the winding stem 54 for the spring 55 of a chronometer movement 56. Operation of the motor M" keeps energy stored in the spring 55 so that it is available at all times to control the operation of the motor without the need for a separate source of power. The above-described power supply systems are illustrative and other variations will occur to those skilled in the art.

Inasmuch as the governor and the systems in which it can be used are susceptible to wide variation, it will be understood that the above-described embodiments of the invention are illustrative and they should not be considered as limiting the scope of the invention except as set forth in the following claims.

I claim:

1. A governor for synchronizing the operation of a pair of power-driven devices, comprising a pair of coaxial race members, a plurality of rolling members of circular cross-section interposed between and in rolling contact with said race members, a retainer for said rolling members and movable therewith in response to differential movement of said race members, means connected to one of said race members for rotating it, means connected to the other race member for rotating it, and electrical control means connected to said retainer and responsive to movement of said retainer by said race members.

2. A governor for synchronizing the operation of a pair of power driven devices, comprising a pair of coaxial race members, a plurality of rolling members of circular cross section interposed between and in rolling contact with said race members, a retainer for said rolling members and movable therewith in response to differential movement of said race members, means connected to one of said race members for rotating it, means connected to the other race member for rotating it, electrical control means connected to said retainer and responsive to movement of said retainer by said race members, and a lost motion connection in the means connecting said retainer to said controlling means to nullify any intermittent motion of said race members.

3. A governor for regulating the operation of an electrically driven device in relation to the operation of a timer, comprising a pair of coaxial race members, a plurality of balls interposed between and in rolling contact with said race members, a retainer for said balls and movable therewith in response to differential movement of said race members, power input means connected to one of said race members for rotating it, power input means connected to the other race member to rotate it, a switch having contacts movable between closed and open positions and means connecting said retainer and said switch to open and close its contacts in response to movement of said retainer by said race members.

4. A governor for regulating the operation of an electrically driven device in relation to the operation of a timer comprising a pair of coaxial race members, a plurality of balls interposed between and in rolling contact with said race members, a retainer for said balls and movable therewith in response to differential movement of said race members, means connected to one of said race members for rotating it intermittently, and means connected to the other race member to rotate it, a switch having contacts movable between open and closed positions and means connecting said retainer to said switch to open and close its contact, said means connecting to said retainer to said switch including a lost-motion connection to nullify the intermittent rotation of said one race member.

5. A governor for regulating the operation of an electrically driven device in relation to the operation of a timer, comprising a pair of coaxial race members, a plurality of balls interposed between and in rolling contact with said race members, a retainer for said balls and movable therewith in response to differential movement of said race members, a first shaft connected to one of said race members for rotating it, a second shaft connected to the other race member to rotate it, a switch having contacts movable between open and closed positions, said switch having an actuating member having limited lost-motion therein between open and closed positions of said contacts, an arm extending outwardly from said retainer and movable therewith, said arm being connected to said actuating member for moving it to open and close said contacts.

6. The governor set forth in claim 5 comprising a slip clutch connecting said arm to said retainer to permit relative movement therebetween.

References Cited in the file of this patent

UNITED STATES PATENTS

| | | |
|---|---|---|
| 1,971,141 | Holst | Aug. 21, 1934 |
| 2,543,077 | Treseder | Feb. 27, 1951 |